US006439780B1

(12) United States Patent
Mudd et al.

(10) Patent No.: US 6,439,780 B1
(45) Date of Patent: Aug. 27, 2002

(54) FIELD-INSTALLABLE FIBER OPTIC RIBBON CONNECTOR AND INSTALLATION TOOL

(75) Inventors: Ronald L. Mudd, Euless, TX (US); Markus A. Giebel, Hickory, NC (US); Michael de Jong, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/652,447

(22) Filed: Aug. 31, 2000

(51) Int. Cl.[7] ................................................. G02B 6/36
(52) U.S. Cl. ....................................................... 385/83
(58) Field of Search ............................... 385/83, 59, 62, 385/71, 53, 55, 56, 60, 72, 140, 73; 350/96, 21, 96.22, 96.23, 96.21

(56) References Cited

U.S. PATENT DOCUMENTS

| | | | | |
|---|---|---|---|---|
| 4,142,776 A | * | 3/1979 | Cherin et al. .................. 385/71 |
| 4,787,697 A | * | 11/1988 | Alrutz ........................ 350/96.2 |
| 4,919,510 A | * | 4/1990 | Hoke et al. ............... 350/96.21 |
| 4,964,688 A | * | 10/1990 | Cldwell et al. ................. 385/56 |
| 5,040,867 A | | 8/1991 | de Jong et al. ................ 385/60 |
| 5,093,881 A | * | 3/1992 | Bortolin et al. .............. 385/114 |
| 5,261,020 A | | 11/1993 | de Jong et al. ................ 385/76 |
| 5,337,390 A | | 8/1994 | Henson et al. ................. 385/81 |
| 5,720,907 A | * | 2/1998 | Anderson et al. ............ 264/275 |
| 6,022,150 A | | 2/2000 | Erdman et al. ................. 385/81 |
| 6,173,097 B1 | * | 1/2001 | Throckmorton et al. ...... 385/59 |
| 6,189,757 B1 | * | 2/2001 | Yoshida et al. ................ 225/96 |
| 6,244,488 B1 | * | 6/2001 | Tanaka ....................... 225/96.5 |
| 6,256,446 B1 | * | 7/2001 | Brunsting et al. ........... 385/140 |

FOREIGN PATENT DOCUMENTS

EP 0886155 A1 12/1998 ............ G02B/6/38

* cited by examiner

*Primary Examiner*—Neil Abrams
*Assistant Examiner*—J. F. Duverne

(57) ABSTRACT

A fiber optic cable connector for an optical ribbon comprises a multi-fiber ferrule having a plurality of stub fibers secured therein with ends of the fibers projecting beyond the end of the ferrule. The connector also includes first and second opposed splice members extending lengthwise from a first end proximate the end of the ferrule to an opposite second end, and the ends of the stub fibers extend between the opposed splice members at the first end thereof and are disposed in fiber-aligning grooves formed in the first splice member. The splice members are arranged with a fiber-receiving space therebetween to allow the optical fibers of the fiber optic ribbon to be inserted through the fiber-receiving space such that the optical fibers engage the grooves and are guided by the grooves into optically connected relation with the ends of the stub fibers. The connector further includes a cam movable between an initial position allowing the splice members to move apart to enlarge the fiber-receiving space to facilitate insertion of the optical fibers therein, and a final position in which the cam urges the splice members in the vicinity of the ends of the stub fibers toward each other to clamp the ribbon fibers therebetween. The rear end portion of the second splice member can pivot away from the first splice member to facilitate inserting the ribbon into the connector. A tool for installing the connector in the ribbon is also disclosed.

20 Claims, 7 Drawing Sheets

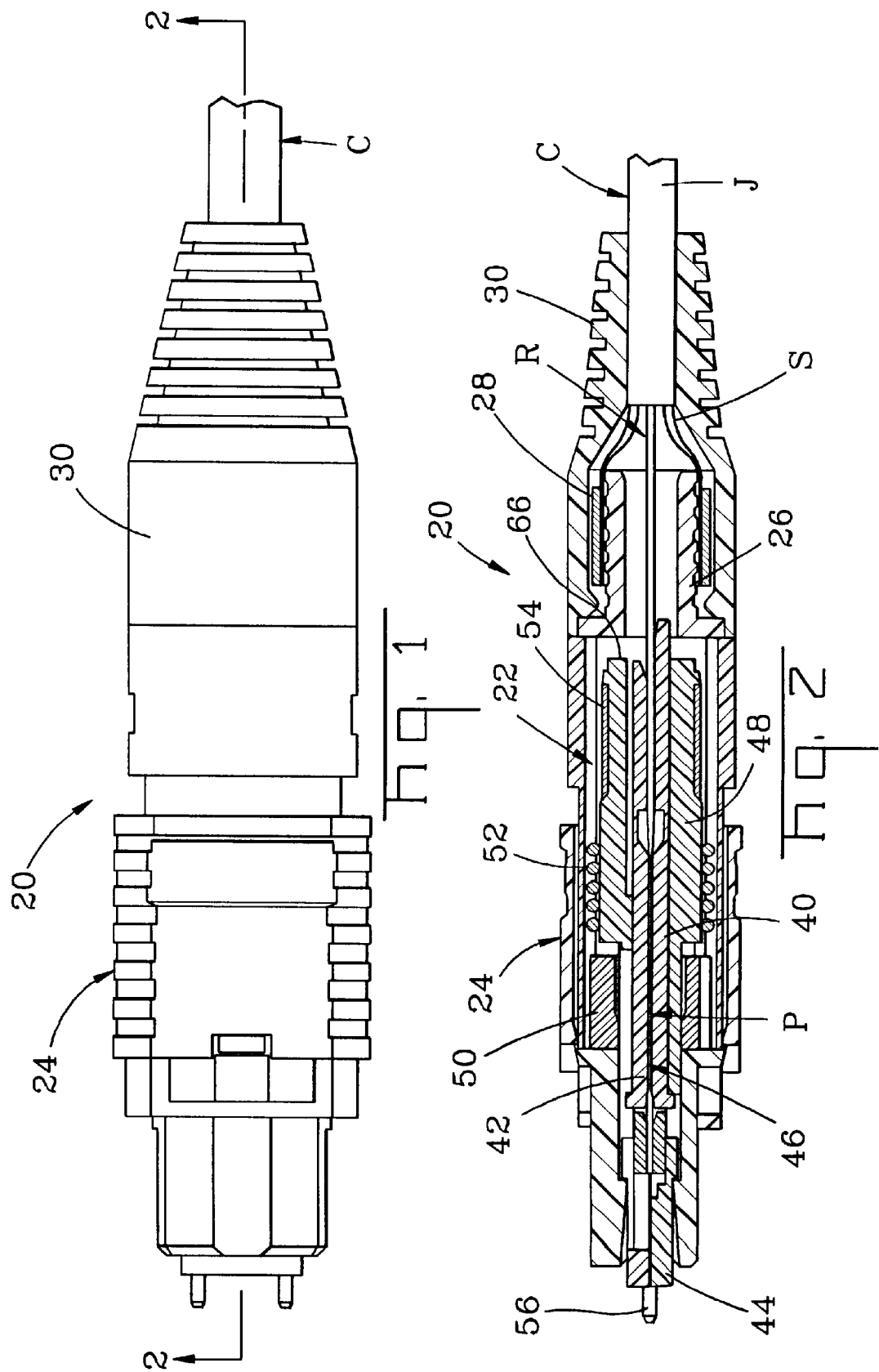

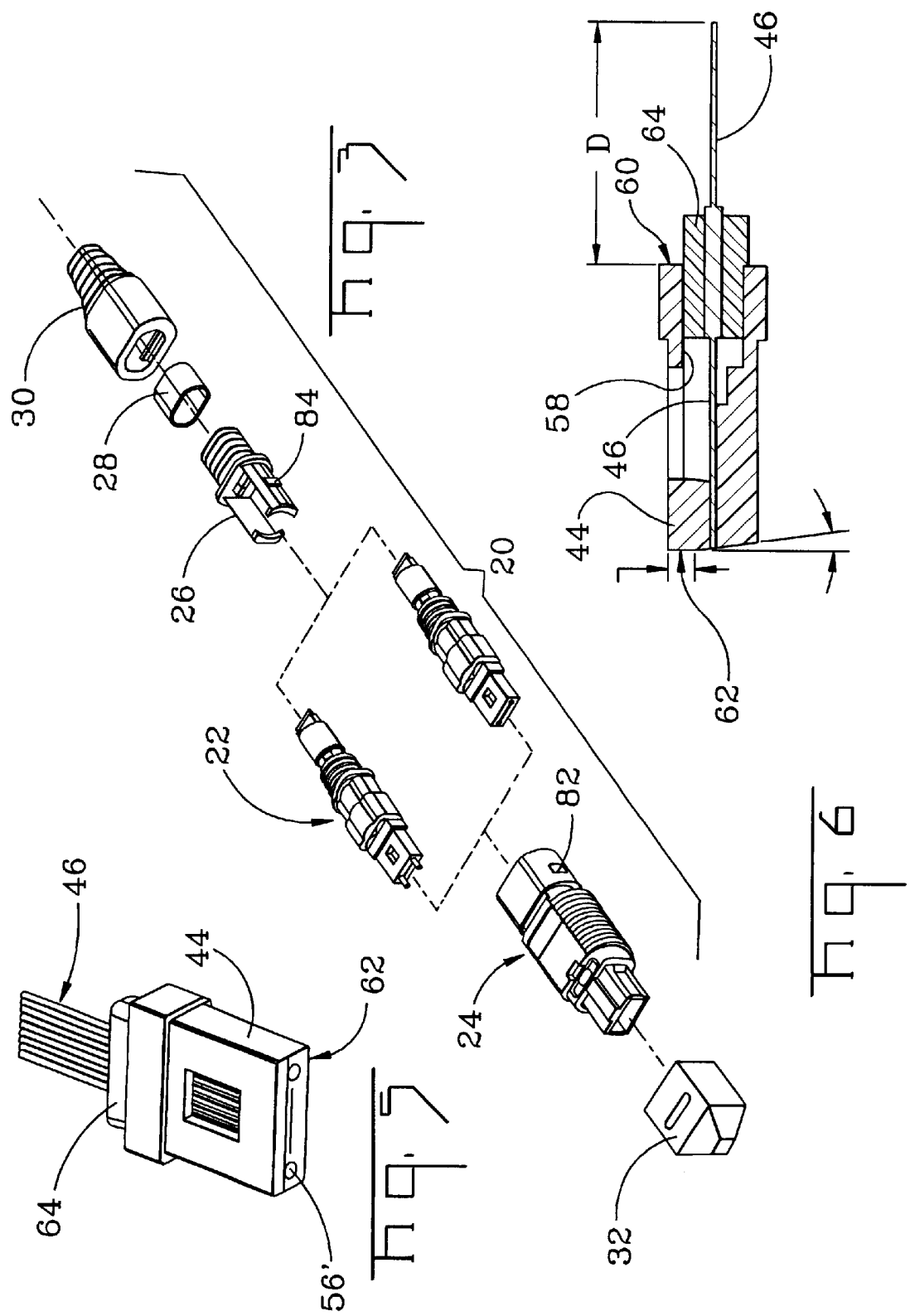

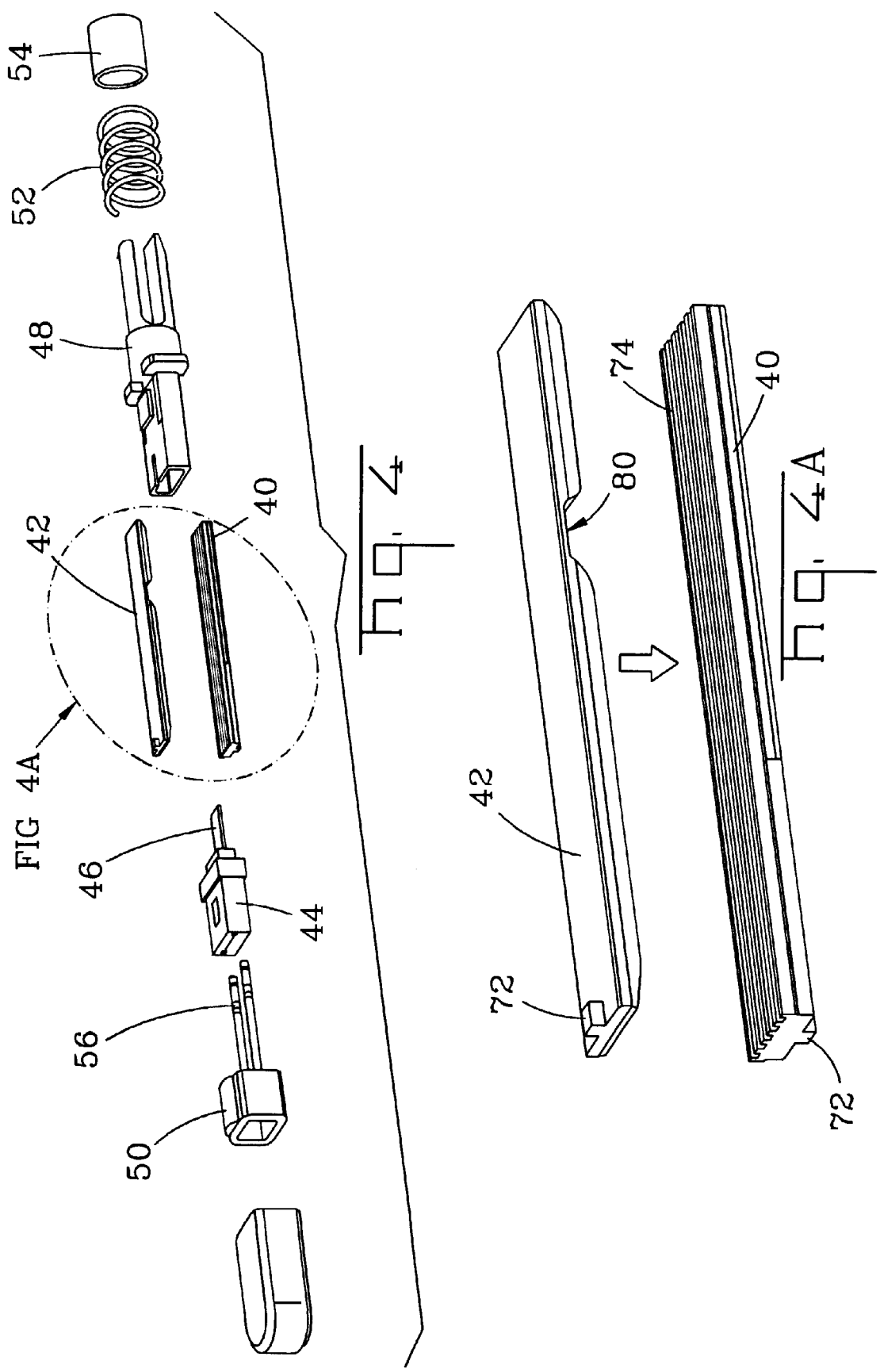

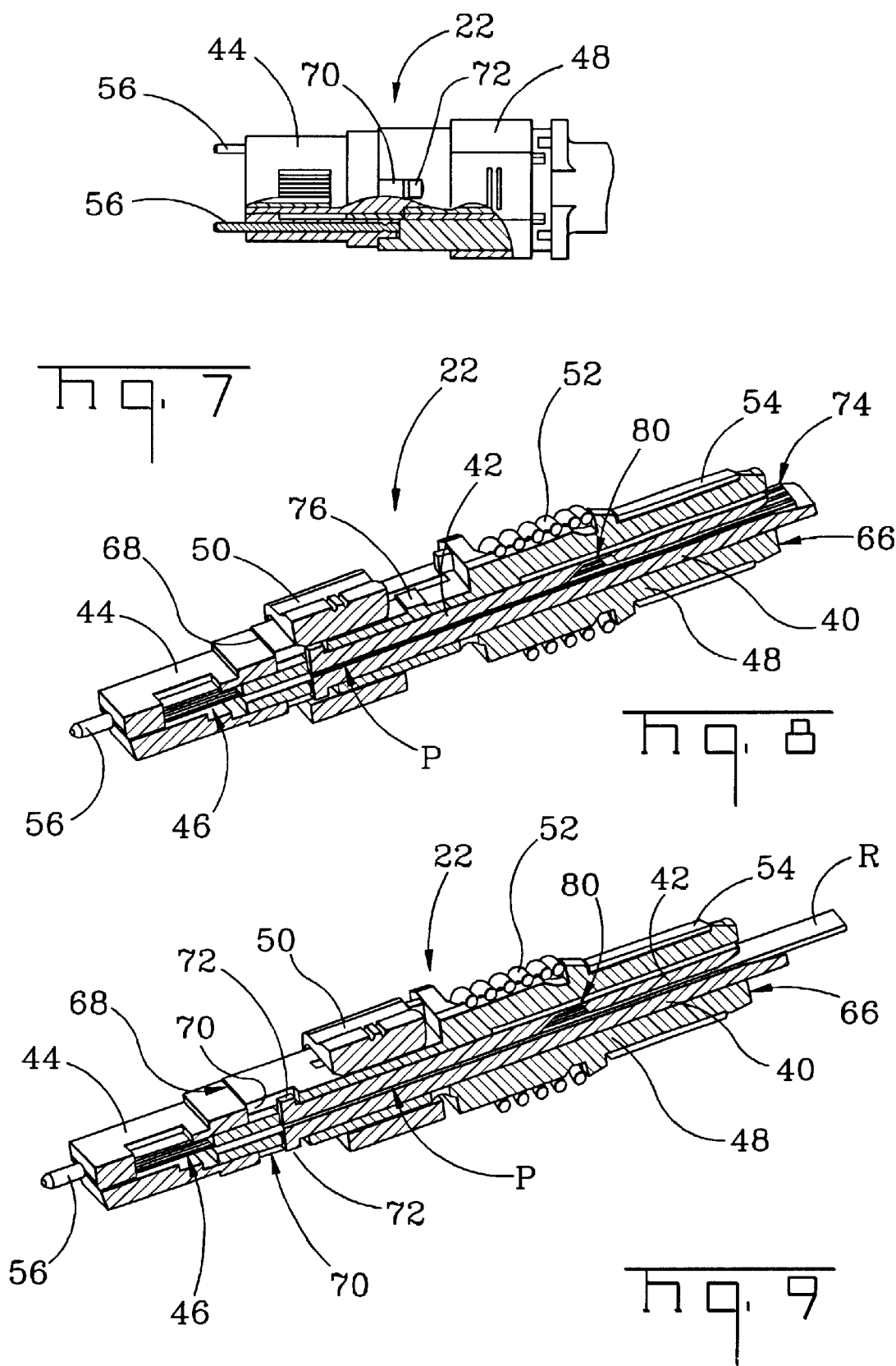

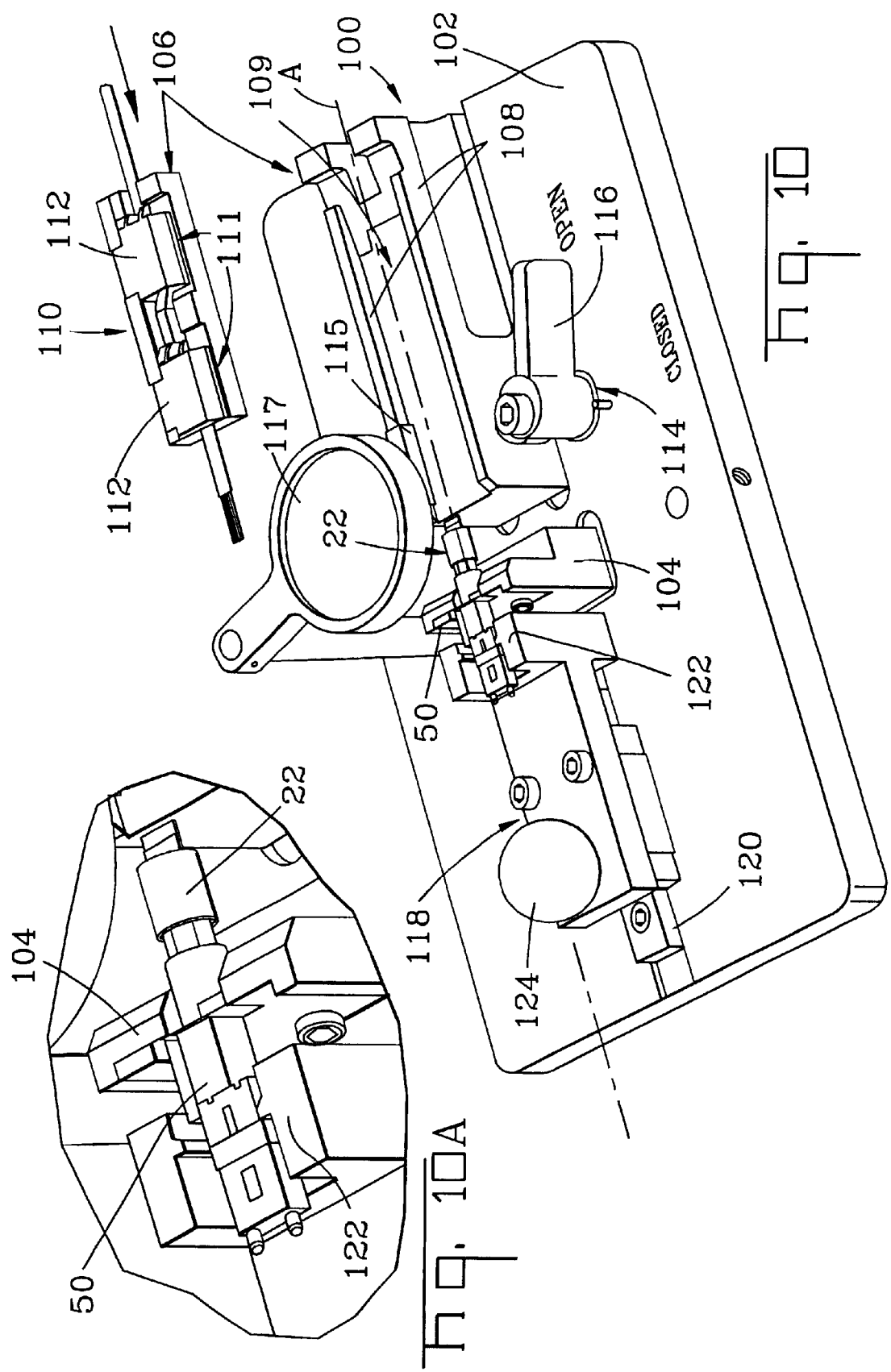

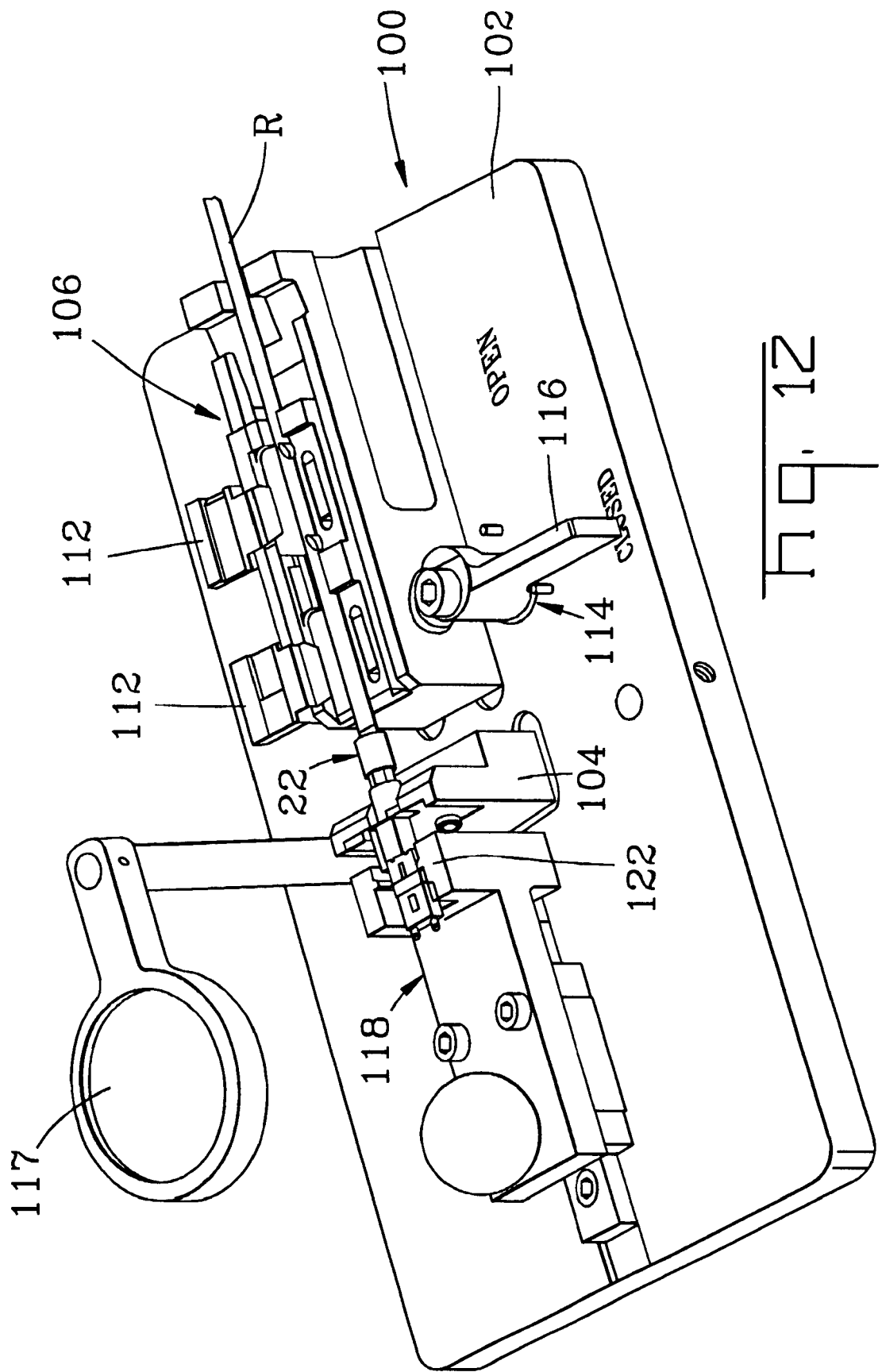

FIELD-INSTALLABLE FIBER OPTIC RIBBON CONNECTOR AND INSTALLATION TOOL

FIELD OF THE INVENTION

The present invention relates to connectors for connecting ends of optical fibers together. The invention relates more particularly to fiber optic cable connectors for cables in the form of ribbons and to tools for installing the connectors on the ends of the cables.

BACKGROUND OF THE INVENTION

Fiber optic ribbon cable generally comprises a plurality of optical fibers arranged parallel to one another in a side-by-side planar array and bound together by a matrix covering of polymer material. Ribbon cables are typically terminated by a single connector that is attached to the end of the cable, since it is more cost-effective to employ a single connector for the multiple fibers of the cable than to use a separate connector for each fiber.

A variety of connectors and connection methods have been proposed for terminating fiber optic ribbon cables. One approach that has been taken is to mechanically bind the fibers to the connector using a heat-activated epoxy adhesive. Unfortunately, this technique requires time and a heat source to cure the adhesive. Furthermore, after curing of the adhesive, the ends of the ribbon fibers then must be polished to restore their optical performance. The polishing equipment is expensive, and the process is time-consuming and not practical for use in the field.

U.S. Pat. No. 5,093,881 discloses a ribbon cable connector having a ferrule formed by two semi-cylindrical elements defining opposing faces between which the fibers of a cable are disposed, and a sleeve that surrounds the ferrule. One of the semi-cylindrical elements of the ferrule defines a plurality of V-shaped grooves formed in its face that opposes the other semi-cylindrical element and extending over part of the element's length. The grooves receive end portions of the fibers that have been stripped of the plastic covering of the ribbon cable, with the end faces of the fibers flush with an end face of the ferrule. The remainder of the length of the element has a recess defined in the face for receiving a length of the ribbon cable having the plastic covering still intact. The ribbon cable is secured in the ferrule by an adhesive applied in the recess containing the non-stripped part of the cable. Installing the connector of the '881 patent requires polishing or lapping the end face of the ferrule and the end faces of the fibers after the fibers are secured in the ferrule. Thus, the connector is not convenient for use in the field.

U.S. Pat. No. 4,142,776 discloses a two-piece connector for fiber optic ribbon cable, having a substrate with fiber-receiving grooves and a mating cover placed in facewise opposition to the substrate covering the fibers in the grooves. The connector is contained in a cartridge, either with an interference fit that forces the cover and substrate together to clamp the fibers therebetween, or with a clearance between the cartridge and the connector in which case set screws are used for providing the clamping force urging the cover and substrate together. A similar two-piece connector on the end of another cable is also disposed in the cartridge with end faces of the connectors in abutting relation. The '776 patent indicates that polishing of the end faces of the fibers and connector is optional, but if polishing is to be accomplished with the connector of the '776 patent it must be performed after the fibers are installed in the connector. Thus, the connector is not practical for use in the field.

U.S. Pat. No. 4,964,688 discloses a fiber optic connector and method for its use, in which a fiber optic stub is secured in a passage extending through a connector body with a first end face of the stub flush with a first end face of the connector body and an opposite second end face of the stub in the passage. An optical fiber is inserted into the passage from the opposite second end of the connector body until the end of the fiber abuts the second end face of the stub. The optical fiber is adhesively secured in the connector body. The first end face of the stub and the first end face of the connector body are polished in the factory, thereby avoiding the need for polishing in the field. The connector and method of the '688 patent are limited to terminating single optical fibers.

SUMMARY OF THE INVENTION

The present invention seeks to overcome the drawbacks noted above by providing a fiber optic connector for ribbon cables that is convenient for use in the field. In one aspect of the invention, a fiber optic cable connector comprises a multi-fiber ferrule extending longitudinally between opposite first and second ends, the ferrule defining at least one longitudinal passageway therethrough, and a plurality of stub fibers disposed in the passageway of the ferrule and secured therein, the stub fibers having ends projecting longitudinally rearward from the second end of the ferrule. The connector also includes first and second opposed splice members each extending longitudinally from a first end proximate the second end of the ferrule to an opposite second end, one of the splice members including longitudinal fiber-aligning grooves and the ends of the stub fibers extending between the opposed splice members in the grooves and terminating at a position intermediate the first and second ends of the splice members. The splice members are configured to allow the fiber optic ribbon to be inserted longitudinally between the second ends of the splice members toward the first ends thereof such that the optical fibers are guided by the grooves into abutment with the ends of the stub fibers that protrude rearwardly from the second end of the ferrule. The connector further comprises a cam movable between an initial position allowing the splice members to move apart to facilitate insertion of the optical fibers therebetween, and a final position in which the cam urges the splice members in the vicinity of the intermediate position thereof toward each other to clamp the optical fibers therebetween.

The stub fibers have mating end faces that are proximate an end face of the ferrule for mating with optical fibers of another connector or other fiber optic device. The mating end faces of the stub fibers preferably are polished in the factory when the ferrule and stub fibers are assembled together. Thus, there is no need to polish any fibers in the field when installing the connector on the end of a ribbon cable, rendering the connector convenient for use in the field.

In one preferred embodiment of the invention, at least one of the splice members has a portion proximate the second end thereof that can flex away from the other splice member to facilitate insertion of the optical fiber ribbon. Preferably, this is accomplished by providing the one splice member with a region of substantially reduced thickness relative to the rest of the splice member, the reduced-thickness region acting as a hinge allowing the flexible portion to pivot relative to the rest of the splice member. The reduced-thickness region of the splice member is spaced from the ends of the stub fibers in the direction of the second end of the splice members. During connector installation, when the stripped ends of the ribbon fibers are inserted between the splice members into the fiber-aligning grooves, the pivotable portion of the one splice member is close to the other splice member to keep the fibers in the grooves and prevent the fibers from crossing over one another. The fiber-aligning grooves can be provided in either the splice member having the flexible portion or in the other splice member. When the thicker ribbon matrix of the cable is inserted between the splice members, the pivotable portion of the one splice member flexes away from the other splice member to allow the cable to be easily inserted. By allowing the end portion of the one splice member to pivot in this manner, bowing of this splice member along its entire length is prevented. Instead, the flexing is isolated to the second end portion, which tends to prevent damage to the cable fibers that otherwise might occur when inserting the fibers into the connector.

The fiber optic connector preferably also includes a flexible ferrule holder surrounding the splice members, and the cam is slidably engaged with the ferrule holder. The cam when slid into the final position compresses one side of the ferrule holder that is proximate one of the splice members so as to urge the one splice member toward the other. The connector preferably also includes a crimp tube surrounding a portion of the ferrule holder that is radially outward of the second end of the splice members, compression of the crimp tube about the ferrule holder causing the splice members to be urged toward each other to clamp the fiber optic ribbon therebetween.

In accordance with another preferred embodiment of the invention, a fiber optic connector for ribbon cable comprises a multi-fiber ferrule and stub fibers as described above, and first and second opposed splice members each extending longitudinally from a first end proximate the end of the ferrule to an opposite second end, the ends of the stub fibers extending between the opposed splice members and terminating at a position intermediate the first and second ends of the splice members. The second splice member proximate the second end thereof has a pivotable portion operable to pivot away from the first splice member to facilitate insertion of the fiber optic ribbon therebetween. The connector also comprises a flexible ferrule holder surrounding the splice members, and a crimp tube surrounding a portion of the ferrule holder that is radially outward of the pivotable portion of the second splice member. Compression of the crimp tube about the ferrule holder causes the portion of the ferrule holder to urge the pivotable portion of the second splice member toward the first splice member to clamp the fiber optic ribbon therebetween.

The connector according to this embodiment of the invention can include the slidable cam described above, and preferably includes fiber-aligning grooves in one of the splice members. The surface of the splice member having the grooves preferably extends axially beyond the second end of the other splice member to facilitate inserting the optical fibers of the ribbon cable into the grooves. Preferably, the second end of at least one of the splice members includes a tapered surface angled away from the other splice member to facilitate inserting the optical fibers between the splice members.

The fiber optic connector of either of the above-described embodiments can also include a housing enclosing the ferrule and ferrule holder, and a coupling surrounding at least a portion of the housing, the housing and coupling serving to adapt the fiber optic connector to a standard interface. Thus, for example, the connector can be made to be compatible with existing MPO multi-fiber connectors or MT-RJ connectors.

The present invention also provides a tool for installing a connector with a slidable cam as described above onto the end of a fiber optic ribbon cable. The tool in accordance with a preferred embodiment of the invention comprises a support base, a connector support cradle mounted on the support base and configured to receive the connector in a position having the central longitudinal axis of the connector extending along a longitudinal axis of the tool, and a fiber-handling fixture mounted on the support base and structured and arranged to engage the fiber optic ribbon to align the ribbon with the connector supported in the cradle such that the optical fibers of the ribbon can be slid axially into the fiber-receiving space between the splice members of the connector. The cradle holds the connector in a fixed position while allowing the cam to slide between the initial and final positions thereof as previously described. The tool also includes a camming carriage slidably mounted on the support base so as to be slidable along the longitudinal axis of the tool, the camming carriage including a cam-engaging member configured to push the cam of the connector from the initial position to the final position when the camming carriage is slid axially toward a rear end of the connector.

Preferably, the fiber-handling fixture also includes a ribbon holder operable to clamp onto the fiber optic ribbon, and guide members defining a guide track within which the ribbon holder is slidably mounted such that the ribbon holder with the fiber optic ribbon clamped therein can be slid parallel to the longitudinal axis of the tool for inserting the ends of the optical fibers between the splice members of the connector.

The fiber-handling fixture preferably also includes a locking device operable to secure the ribbon holder in a fixed position once the optical fibers have been inserted in the fiber-receiving space between the splice members of the connector. This prevents the fibers from moving back away from the stub fibers when the camming carriage is operated to clamp the fibers in the connector.

The tool can also include a magnifying lens movably mounted on the support base for magnifying an operator's view of the optical fibers and the rear end of the connector to facilitate inserting the optical fibers into the connector.

The invention thus provides a fiber optic connector and installation tool enabling ribbon cables to be easily and conveniently terminated without the need for polishing fibers and without the use of heat-activated epoxy adhesives. The connector and installation tool accordingly are particularly suitable for use in the field. The connector can be made compatible with existing standard interfaces.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 1 is a top elevation of a male-type fiber optic ribbon connector in accordance with a preferred embodiment of the invention;

FIG. 2 is a cross-sectional view taken on line 2—2 of FIG. 1;

FIG. 3 is an exploded perspective view of the connector, showing alternative male and female types of ferrule/holder subassemblies that can be incorporated in the connector;

FIG. 4 is an exploded perspective view of the male-type ferrule/holder subassembly of the connector;

FIG. 4A is an enlarged view of the splice members in FIG. 4;

FIG. 5 is a perspective view of a female-type ferrule of the connector with stub fibers mounted therein;

FIG. 6 is a cross-sectional view on an axial plane through the ferrule of FIG. 5;

FIG. 7 is a fragmentary top elevation of a male-type ferrule/holder subassembly, partly in section;

FIG. 8 is a perspective view of the male-type ferrule/holder subassembly sectioned in half along an axial plane, prior to insertion of a ribbon cable into the connector;

FIG. 9 is a view similar to FIG. 8, showing the subassembly after a ribbon cable has been inserted and the cam has been moved into its final position to clamp the fibers;

FIG. 10 is a perspective view of an installation tool in accordance with a preferred embodiment of the invention, showing a connector loaded in the tool and a ribbon cable secured in the fiber-handling fixture ready to be inserted into the connector;

FIG. 10A is an enlarged view of the connector loaded in the tool prior to insertion of the ribbon cable;

FIG. 12 is a view similar to FIGS. 10 and 11, showing the camming carriage moved back to its starting position in preparation for removing the completed connector/cable assembly from the tool.

DETAILED DESCRIPTION OF PREFERRED EMBODIMENTS

Figure 11:
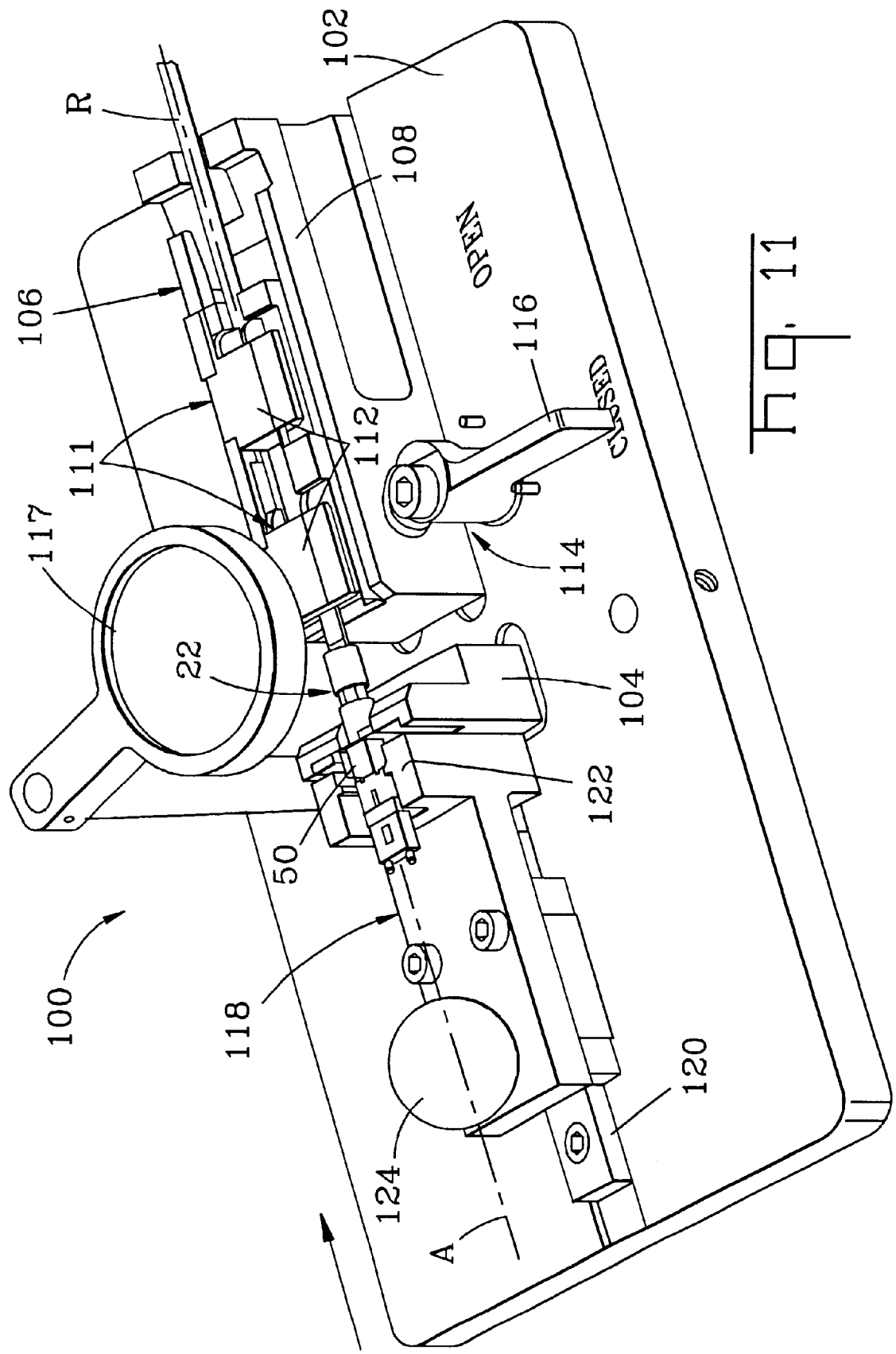
FIG. 11 is a view similar to FIG. 10, showing the ribbon cable having been inserted into the connector and the fiber-handling fixture locked in position, and showing the camming carriage slid toward the rear end of the connector to move the cam into its final position on the connector.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference initially to FIGS. 1–3, a fiber optic connector 20 in accordance with one preferred embodiment of the invention is illustrated. The connector 20 is designed to be attached to the end of a fiber optic ribbon cable C. The cable C typically includes a fiber optic ribbon R surrounded by an outer protective jacket J. The interior passage of the jacket may contain strength members S such as yarns of aramid fibers or the like. The ribbon R has a plurality of optical fibers arranged in a planar arrangement parallel to one another and bound together by a covering or matrix typically formed of a suitable polymer material. An optical fiber typically includes a silica-based core that is operative to transmit light and is surrounded by a silica-based cladding having a lower index of refraction than the core. A soft primary coating surrounds the cladding, and a relatively rigid secondary coating surrounds the primary coating. In preparation for installing the connector 20 on the end of the cable C, the outer jacket J is removed from a lengthwise-extending end portion of the cable to expose the ribbon R. Then the matrix material of the ribbon R is stripped from an end part of the ribbon, and the fibers are dressed and cleaved in conventional fashion.

The connector 20 includes a ferrule/holder subassembly 22 (alternative male and female types of the ferrule/holder subassembly being shown in FIG. 3), a coupling/housing subassembly 24, a crimp body 26, a crimp ring 28, and a boot 30. The ferrule/holder subassembly 22 contains the components that clamp onto the exposed optical fibers of the ribbon R to fix the fibers in optically coupled relation with internal stub fibers contained within the ferrule/holder subassembly, and that clamp onto the matrix material of the unstripped portion of the ribbon, as further described below. The crimp ring 28 is crimped about the crimp body 26 with the strength members S of the cable clamped therebetween, and the boot 30 is slid over the crimp ring and crimp body, thereby providing strain relief for the cable C. The crimp body 26 connects the ferrule/holder subassembly 22 to the coupling/housing subassembly 24. The coupling/housing subassembly 24 configures the connector 20 so that it is compatible with a standard optical fiber connector, for example, an MPO multi-fiber connector or the like. The connector can also include a dust cap 32 for covering the ferrule end of the connector when the connector is not plugged into a compatible receptacle.

The ferrule/holder subassembly 22 is now described with primary reference to FIGS. 4–9. FIGS. 4 and 7–9 relate to a male-type ferrule/holder subassembly 22 while FIGS. 5 and 6 illustrate a ferrule for a female-type ferrule/holder subassembly 22, the chief difference between the male and female types being the provision of protruding alignment pins 56 in the ferrule for the male type, which are installed in pin-receiving receptacles 56' in the ferrule. In the female-type ferrule/holder subassembly, no pins are installed in the receptacles 56', so that these receptacles are left open for receiving alignment pins of another connector upon connection with the connector 20. The ferrule/holder subassembly 22 of the connector comprises a first splice member 40 and a second splice member 42 between which the fibers of the fiber optic ribbon are clamped upon installation of the connector, a multi-fiber ferrule 44 containing a plurality of stub fibers 46, a ferrule holder 48, a cam 50, a main spring 52, and a crimp band 54.

The multi-fiber ferrule 44 is preferably constructed of a polymer material such as glass-filled epoxy resin, but alternatively can be constructed of ceramic. As best seen in FIGS. 5 and 6, the ferrule 44 has a passage 58 formed through it in a lengthwise direction of the ferrule from a second end 60 partway along the length of the ferrule in the direction of an opposite first end 62 of the ferrule. In the illustrated embodiment, the passage 58 is relatively large and has a ferrule extension 64 mounted therein. Optical fiber stubs 46 are mounted in the ferrule extension, which in turn is mounted in the ferrule. It is convenient to provide the ferrule extension 64 with a passage slightly larger than the optical ribbon formed through it, thereby enabling a short length of optical ribbon to be inserted through this passage such that the ribbon extends out from both ends of the ferrule extension. The ribbon is bonded in the ferrule extension with a suitable adhesive. The matrix material of the ribbon is stripped from the portions of the ribbon that protrude out from both ends of the ferrule extension so as to expose the optical fibers 46. The ferrule 44 also has a plurality of fiber-receiving passages slightly larger in diameter than the optical fibers 46 that extend through the first end 62 of the ferrule and lead into the passage 58 in alignment with the fibers 46 mounted in the ferrule extension 64. The ends of the fibers 46 are inserted through the fiber-receiving passages by inserting the ferrule extension 64 into the passage 58, until the ends of the fibers are flush with or slightly protruding out from the first end face 62 of the ferrule. If the fiber ends protrude out from the passages then the fibers are cut or otherwise processed to make the fiber ends substantially flush with the ferrule end face. The fibers 46 are bonded in the fiber-receiving passages, and at the same time the ferrule extension 64 is bonded in the ferrule 44. The end face 62 of the ferrule and the ends of the fibers 46 are then polished to produce a high-quality finish. The opposite ends of the fibers 46 that extend beyond the second end 60 of the ferrule are cleaved, either flat or at an angle as desired, so that all of the fibers terminate a predetermined distance D beyond the second end 60 of the ferrule 44, as shown in FIG. 6. All of the foregoing assembly operations on the ferrule 44 are advantageously performed in the factory.

It is possible to omit the ferrule extension 64 and mount the fibers 46 directly in the ferrule 44, suitably modified to provide proper support to the fibers. The particular construction of the ferrule is not critical to the present invention, and any construction can be employed providing the ability to mount the stub fibers 46 so that the mating ends of the fibers at the end face 62 of the ferrule are in suitable condition to make optical connections with fibers in another device or connector with which the connector of the present invention is compatible. It is advantageous, of course, to configure the ferrule 44 so that it is compatible with a standard type of connector or device, such as an MPO multi-fiber connector, MT-RJ connector, or the like.

The ferrule holder 48 has a generally tubular configuration defining an interior passage that extends longitudinally therethrough. The first and second splice members 40, 42 are inserted into the interior passage of the ferrule holder 48 through a forward end 68 thereof that is proximate the ferrule. Near the forward end 68 of the ferrule holder 48 a pair of notches or recesses 70 are defined in the ferrule holder for receiving outwardly protruding projections 72 formed on the first or forward ends of the splice members 40, 42 so as to prevent the splice members from being inserted too far into the ferrule holder. The face of the first splice member 40 that opposes the second splice member 42 has a plurality of fiber-receiving grooves 74 (FIG. 4A) that extend parallel to one another at the same spacing as the fibers in the ribbon R to which the connector is to be attached. The grooves 74 extend along the entire length of the first splice member; alternatively, the grooves could be formed in the face of the second splice member 42. The ferrule extension 64 of the ferrule 44 is inserted into the forward end 68 of the ferrule holder 48 and the stub fibers 46 are inserted between the first and second splice members so that the fibers are received in the grooves 74 in the first splice member. The ferrule extension 64 is bonded with adhesive in the ferrule holder 48. An index-matching gel (not shown) can be applied around the stub fibers 46 that are disposed between the splice members 40, 42. These ends of the stub fibers 46 terminate at an intermediate position P (FIG. 2) located between the first or forward ends of the splice members and the second or rear ends of the splice members. The second end of the splice member having the fiber-aligning grooves 74, which in the illustrated embodiment is the first splice member 40, preferably extends axially rearward of the rear end 66 of the ferrule holder 48 to facilitate inserting the fibers of a ribbon cable into the grooves as further described below.

The cam 50 is mounted about the ferrule holder 48 in an initial position generally axially aligned with the first or forward ends of the splice members as shown in FIG. 8. The cam and ferrule holder are complementarily configured to allow the cam 50 to slide axially along the ferrule holder in the direction of the rear end 66 thereof to a final position generally axially aligned with the intermediate position P at which the stub fibers 46 terminate, as shown in FIG. 9. The ferrule holder 48 has an outwardly bulging cam surface 76 that faces an inwardly facing surface of the cam 50, and when the cam 50 is slid to the final position of FIG. 9 the cam presses inwardly on the cam surface 76 so as to compress the ferrule holder against the second splice member 42, thereby compressing the second splice member toward the first splice member 40. Of course, the cam and associated cam surface could be configured to urge either of the splice members toward the other, or to urge both of the splice members toward each other.

The second splice member 42 has a generally constant thickness along its length, except for a reduced-thickness region 80 having a substantially smaller thickness than the rest of the second splice member. The reduced-thickness region 80 is located at an axial position between the ends of the stub fibers 46 and the second or rear ends of the splice members. The reduced-thickness region 80 acts as a hinge allowing the rear portion of the second splice member rearward of the region 80 to pivot relative to the rest of the second splice member and away from the first splice member. This allows the fiber-receiving space between the splice members to enlarge when inserting the ribbon therebetween.

Thus, as illustrated in FIG. 9, the ribbon R is inserted between the splice members 40, 42 with the fibers of the ribbon from which the matrix material has been removed being inserted into the grooves 74 in the first splice member. With the cam 50 in its initial position, there is sufficient distance between the splice members to allow the ribbon fibers to readily slide in the grooves 74, but the distance is small enough to prevent the fibers from crossing over one another. The ribbon is inserted until the ends of the fibers of the ribbon abut the ends of the rearwardly protruding stub fibers 46. The length of the exposed fibers of the ribbon is such that the part of the ribbon with the matrix still intact extends between the first splice member 40 and the pivotal rear portion of the second splice member 42 when the fibers are abutting the ends of the stub fibers. The pivotal rear portion can flex away from the first splice member to make insertion of the ribbon easier and to prevent damage to the fibers. Once the ribbon is thus filly inserted, the cam 50 is slid axially into its final position, thereby clamping the ribbon fibers between the splice members. The crimp tube 54 is then crimped with a crimping tool about the rear end of the ferrule holder 48 so as to compress the ribbon between the rear end portions of the splice members, thereby securing the ferrule/holder subassembly 22 on the end of the ribbon cable.

Prior to securing the ferrule/holder subassembly 22 on the cable, of course, the boot 30, crimp band 28, and crimp body 26 would have been slid in that order onto the cable. Once the ferrule/holder subassembly 22 is secured on the ribbon, the crimp body 26 is then slid back up the cable and over the ferrule/holder subassembly 22 and the ferrule/holder subassembly 22 is inserted into the coupling/housing subassembly 24 until the crimp body 26 snaps into the coupling/housing subassembly so as to lock the subassemblies 22 and 24 together. To this end, the coupling/housing subassembly 24 includes notches or recesses 82 therein and the crimp body 26 includes complementary projections 84 (FIG. 3) that snap into the notches 82 to prevent the crimp body from separating from the coupling/housing subassembly.

FIGS. 10–12 illustrate a tool for installing the connector on the ribbon cable in accordance with a preferred embodiment of the invention. The tool 100 includes a generally plate-shaped support base 102. On an upper surface of the support base a connector support cradle 104 is mounted. The cradle 104 is configured to cradle the ferrule/holder subassembly 22 of the connector so as to hold the subassembly in a fixed position while allowing the cam 50 of the subassembly to slide along the ferrule holder between its initial and final positions. The cradle 104 positions the subassembly 22 with its central longitudinal axis aligned along a longitudinal axis A of the tool.

The tool also includes a fiber-handling fixture 106 for supporting the fiber optic ribbon R to facilitate aligning the fibers of the ribbon with the ferrule/holder subassembly 22 and inserting the ribbon between the splice members thereof. The fiber-handling fixture 106 includes guide members 108 defining a guide track 109 that extends along the longitudinal axis A of the tool along which the ferrule/holder subassembly 22 is aligned when supported in the cradle 104. The fixture 106 also includes a ribbon holder 110 configured to slide within the guide track along the longitudinal axis A, and operable to clamp onto the ribbon R so that the ribbon is advanced along the tool axis when the ribbon holder 110 is slid along the guide track. The ribbon holder 110 includes a pair of clamps 111 that clamp onto the ribbon R. The clamps have upper doors 112 that can be opened to allow the ribbon R to be inserted into and removed from the clamps in a generally vertical direction.

The fiber-handling fixture 106 further includes a locking device 114 for locking the ribbon holder 110 in a fixed position within the guide track. The locking device includes an operating lever 116 movable between an open position (FIG. 10) and a closed position (FIG. 11). The operating lever 116 is connected with a clamping member 115 (FIG. 10) that is moved so as to clamp against the ribbon holder 110 when the operating lever is rotated to the closed position. In the open position of the lever the ribbon holder is free to slide along the guide track of the fiber-handling fixture for inserting the ribbon fibers into the ferrule/holder subassembly 22. The tool includes a magnifying lens 117 movably mounted on the support base 102 so that it can be moved into a position above the rear end of the ferrule/holder subassembly 22 as shown in FIG. 10 to provide the operator with a magnified view of the ribbon fibers and subassembly for facilitating insertion of the fibers into the grooves of the first splice member as previously described. After the ribbon fibers have been inserted into the subassembly 22, the locking device operating lever 116 is moved to the closed position as in FIG. 11 to prevent the ribbon from moving rearward during subsequent operations of the tool.

The tool 100 also includes a camming carriage 118 slidably mounted on a guide member 120 affixed to the upper surface of the support base 102. The carriage 118 is slidable in a direction parallel to the longitudinal tool axis A, and supports a cam-engaging member 122 configured to engage the cam 50 of the ferrule/holder subassembly 22. Pushing the carriage 118 in the direction toward the rear end of the subassembly 22, as shown in FIG. 11, causes the cam-engaging member 122 to push the cam 50 from its initial position to its final position so as to clamp the ribbon fibers in the subassembly 22. The carriage 118 includes a handle or palm rest 124 that the hand of the operator can be placed on when pushing the carriage. Thus, once the ribbon fibers have been inserted into the subassembly 22 and the locking device 114 of the fiber-handling fixture has been closed to lock the ribbon in a fixed position, the camming carriage 118 is pushed toward the rear end of the subassembly as shown in FIG. 11 to move the cam 50 to its final position, thereby clamping the ribbon fibers in the subassembly. Finally, the camming carriage 118 is pulled back to its starting position and the magnifying lens 117 is moved out of the way and the ribbon holder doors 112 are opened as in FIG. 12 to allow the subassembly 22 and ribbon R to be lifted upward out of the tool.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fiber optic connector for a fiber optic ribbon, comprising:

a multi-fiber ferrule extending longitudinally between opposite first and second ends, the ferrule defining at least one longitudinal passageway therethrough;

a plurality of stub fibers disposed in the at least one passageway of the ferrule and secured therein, the stub fibers having ends projecting longitudinally beyond the second end of the ferrule;

first and second opposed splice members each extending longitudinally from a first end proximate the second end of the ferrule to an opposite second end, one of the splice members including longitudinal fiber-aligning grooves and the ends of the stub fibers extending between the opposed splice members in the grooves and terminating at a position intermediate the first and second ends of the splice members, the splice members being configured to allow the fiber optic ribbon to be inserted longitudinally between the second ends of the splice members toward the first ends thereof such that the optical fibers are guided by the grooves into abutment with the ends of the stub fibers; and a cam movable between an initial position allowing the splice members to move apart to facilitate insertion of the optical fibers therebetween, and a final position in which the cam urges the splice members in the vicinity of the intermediate position thereof relatively toward each other to clamp the optical fibers therebetween.

2. The fiber optic connector of claim 1, wherein at least one of the splice members has a portion proximate the second end thereof that can flex away from the other splice member to facilitate insertion of the optical fiber ribbon.

3. The fiber optic connector of claim 2, wherein the first splice member is substantially rigid and has the fiber-aligning grooves, and the second splice member has the portion that can flex.

4. The fiber optic connector of claim 3, wherein the portion of the second splice member that can flex is contiguous with a region of the second splice member having a substantially reduced thickness relative to the rest of the second splice member, the reduced-thickness region acting as a hinge allowing the flexible portion to pivot relative to the rest of the second splice member.

5. The fiber optic connector of claim 4, wherein the reduced-thickness region of the second splice member is spaced from the intermediate position in the direction of the second end of the splice members.

6. The fiber optic connector of claim 1, further comprising a flexible ferrule holder surrounding the splice members, the cam being slidably engaged with the ferrule holder, the cam when slid into the final position compressing one side of the ferrule holder that is proximate one of the splice members so as to urge the one splice member toward the other.

7. The fiber optic connector of claim 6, further comprising a crimp tube surrounding a portion of the ferrule holder that is radially outward of the second end of the splice members, compression of the crimp tube about the ferrule holder causing the splice members to be urged toward each other to clamp the fiber optic ribbon therebetween.

8. The fiber optic connector of claim 1, wherein the stub fibers have mating end faces that are proximate a forward end face of the ferrule and that are polished.

9. A fiber optic connector for connecting to ends of a plurality of optical fibers of a fiber optic ribbon, comprising:
   a multi-fiber ferrule extending longitudinally between opposite first and second ends, the ferrule defining at least one longitudinal passageway therethrough;
   a plurality of stub fibers disposed in the at least one passageway of the ferrule and secured therein, the stub fibers having ends projecting longitudinally beyond the second end of the ferrule;
   first and second opposed splice members each extending longitudinally from a first end proximate the second end of the ferrule to an opposite second end, the ends of the stub fibers extending between the opposed splice members and terminating at a position intermediate the first and second ends of the splice members, the splice members being configured to allow the fiber optic ribbon to be inserted longitudinally between the second ends of the splice members toward the first ends thereof such that the optical fibers are moved into abutment with the ends of the stub fibers, the second splice member proximate the second end thereof having a pivotable portion operable to pivot away from the first splice member to facilitate insertion of the fiber optic ribbon therebetween;
   a flexible ferrule holder surrounding the splice members; and
   a crimp tube surrounding a portion of the ferrule holder that is radially outward of the pivotable portion of the second splice member, compression of the crimp tube about the ferrule holder causing the portion of the ferrule holder to urge the pivotable portion of the second splice member toward the first splice member to clamp the fiber optic ribbon therebetween.

10. The fiber optic connector of claim 9, further comprising a cam slidably engaged with the ferrule holder and movable between an initial position generally axially aligned with the first end of the splice members and a final position generally axially aligned with the intermediate position, movement of the cam into the final position compressing the ferrule holder radially inwardly so as to cause the ferrule holder to urge the splice members relatively toward each other to clamp the optical fibers therebetween.

11. The fiber optic connector of claim 10, wherein the first splice member defines a plurality of longitudinally extending parallel grooves in a surface of the first splice member facing the second splice member, the stub fibers being disposed in the grooves such that the stub fibers are aligned by the grooves in a lateral side-by-side relationship, the grooves serving to receive and align the optical fibers of the fiber optic ribbon with the stub fibers.

12. The fiber optic connector of claim 11, wherein the surface of the first splice member having the grooves extends axially beyond the second end of the second splice member to facilitate inserting the optical fibers into the grooves.

13. The fiber optic connector of claim 9, wherein the second end of at least one of the splice members includes a tapered surface angled away from the other splice member to facilitate inserting the optical fibers between the splice members.

14. The fiber optic connector of claim 9, further comprising a housing enclosing the ferrule and ferrule holder, and a coupling surrounding at least a portion of the housing, the housing and coupling serving to adapt the fiber optic connector to a standard interface.

15. A tool for connecting a fiber optic connector to ends of optical fibers of a fiber optic ribbon, the fiber optic connector including opposed splice members defining a fiber-receiving space therebetween for receiving the ends of the optical fibers extending along a direction parallel to a central longitudinal axis of the connector, the connector further including a cam slidable parallel with the central longitudinal axis of the connector between an initial position allowing the splice members to move apart to enlarge the fiber-receiving space to facilitate insertion of the optical fibers therein, and a final position in which the cam urges the splice members toward each other to clamp the optical fibers therebetween, the tool comprising:
   a support base;
   a connector support cradle mounted on the support base and configured to receive the connector in a position having the central longitudinal axis of the connector extending along a longitudinal axis of the tool, the cradle holding the connector in a fixed position while allowing the cam to slide between the initial and final positions thereof;
   a fiber-handling fixture mounted on the support base and structured and arranged to engage the fiber optic ribbon to align the ribbon with the connector supported in the cradle such that the optical fibers of the ribbon can be slid axially into the fiber-receiving space between the splice members of the connector; and
   a camming carriage slidably mounted on the support base so as to be slidable along the longitudinal axis of the tool, the camming carriage including a cam-engaging member configured to push the cam of the connector from the initial position to the final position when the camming carriage is slid axially toward a rear end of the connector.

16. The tool of claim 15, wherein the fiber-handling fixture includes a ribbon holder operable to clamp onto the fiber optic ribbon.

17. The tool of claim 16, wherein the fiber-handling fixture further includes guide members defining a guide track within which the ribbon holder is slidably mounted such that the ribbon holder with the fiber optic ribbon clamped therein can be slid parallel to the longitudinal axis of the tool for inserting the ends of the optical fibers between the splice members of the connector.

18. The tool of claim 17, wherein the ribbon holder comprises two ribbon clamps axially spaced apart within the guide track.

19. The tool of claim 17, wherein the fiber-handling fixture further includes a locking device operable to secure the ribbon holder in a fixed position once the optical fibers have been inserted in the fiber-receiving space between the splice members of the connector.

20. The tool of claim 15, further comprising a magnifying lens movably mounted on the support base for magnifying an operator's view of the optical fibers and the rear end of the connector to facilitate inserting the optical fibers into the connector.

* * * * *